United States Patent

[11] 3,608,970

| [72] | Inventor | William P. Strumbos |
| | | 85 Middleville Road, Northport, N.Y. 11768 |
| [21] | Appl. No. | 776,332 |
| [22] | Filed | Nov. 18, 1968 |
| [45] | Patented | Sept. 28, 1971 |

[54] EMERGENCY WHEELS
13 Claims, 27 Drawing Figs.

[52] U.S. Cl. .................................................... 301/38, 152/418, 254/86, 301/39 C
[51] Int. Cl. ...................................................... B60b 11/00
[50] Field of Search ........................................... 301/36, 38, 39, 36; 152/376, 9, 354, 416, 418, 10, 379; 254/86, 87; 280/150

[56] References Cited
UNITED STATES PATENTS

| 1,253,856 | 1/1918 | Marquette ...................... | 152/418 |
| 2,439,758 | 4/1948 | Sorrentino ..................... | 280/150 A |
| 2,513,584 | 7/1950 | O'Leary ........................ | 301/38 |
| 2,552,031 | 5/1951 | Booth ........................... | 152/418 |
| 2,823,956 | 2/1958 | Gray ............................. | 301/38 |
| 3,404,720 | 10/1968 | Fletcher ....................... | 152/354 |
| 1,846,448 | 2/1932 | Nelson ......................... | 301/38 S |
| 2,201,489 | 5/1940 | Hill .............................. | 301/39 |

FOREIGN PATENTS

| 219,439 | 1/1962 | Austria ........................ | 301/38 |
| 1,198,856 | 6/1959 | France ......................... | 301/38 |

OTHER REFERENCES
Sunday Star Magazine--Spare Tire with Room to Spare--Dec. 4, 1960

*Primary Examiner*—Richard J. Johnson

ABSTRACT: In the art of automotive emergency wheels that are used when a vehicle road tire has been punctured, an invention in which the emergency wheels used are of the type adapted to be mounted on the vehicle road wheel outboard of the damaged tire. The invention comprises a method for installing the wheel, and lightweight emergency wheels having narrow-section tubeless tires suitable for practicing the method. Preferred embodiments of the wheel used in the method incorporate as an integral part of the wheel disk a reservoir for pressurized fluid for inflating the tire. In the method, it is not necessary to jack up the vehicle to install the emergency wheel. In use, the emergency wheel, with its tire in the uninflated condition, is fastened on the vehicle road wheel outboard of the damaged tire. After the emergency wheel is fastened in place, its tire is inflated. This raises the vehicle off its damaged tire and into substantially its normal attitude such that it can be driven safely at reasonable speeds until repair facilities are reached. Also proposed in an emergency wheel construction in which a displacement of the sidewall produced by the inflation of the tire causes clamping means to be forced automatically over the vehicle road wheel rim such that the emergency wheel is clamped thereon pneumatically. A further embodiment uses the pressurized fluid utilized for inflating its tire to actuate the fasteners used to mount the wheel.

PATENTED SEP 28 1971 3,608,970

INVENTOR.
William P. Strumbos

INVENTOR.
William P. Drumheller

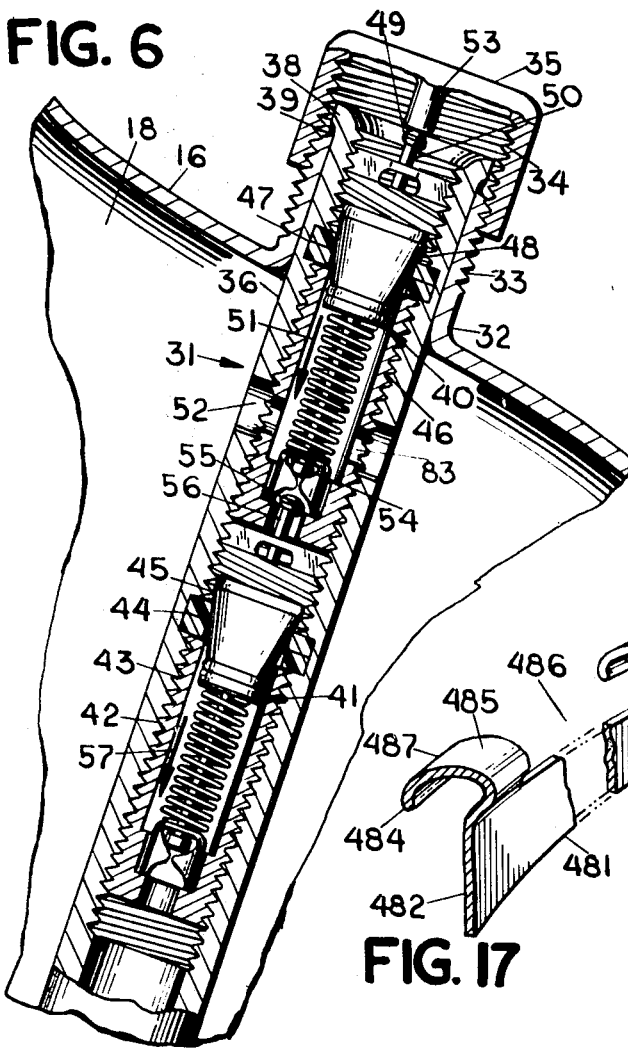
FIG. 6
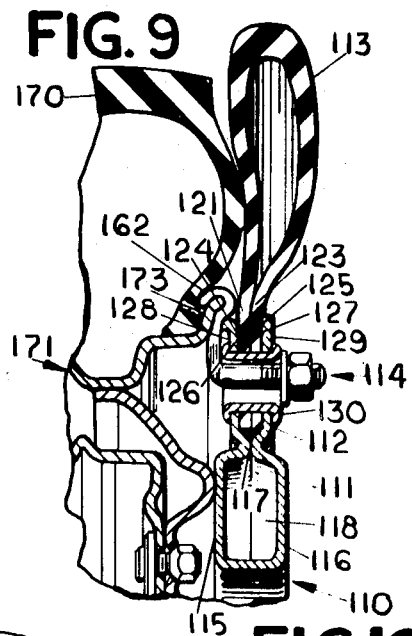
FIG. 9
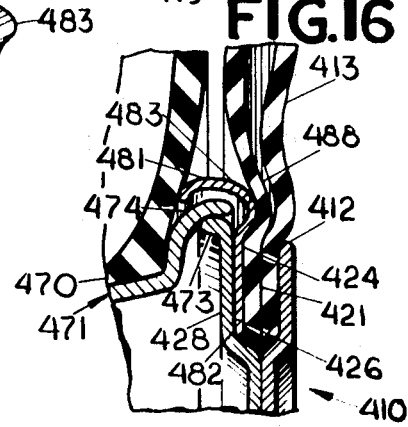
FIG. 17
FIG. 16
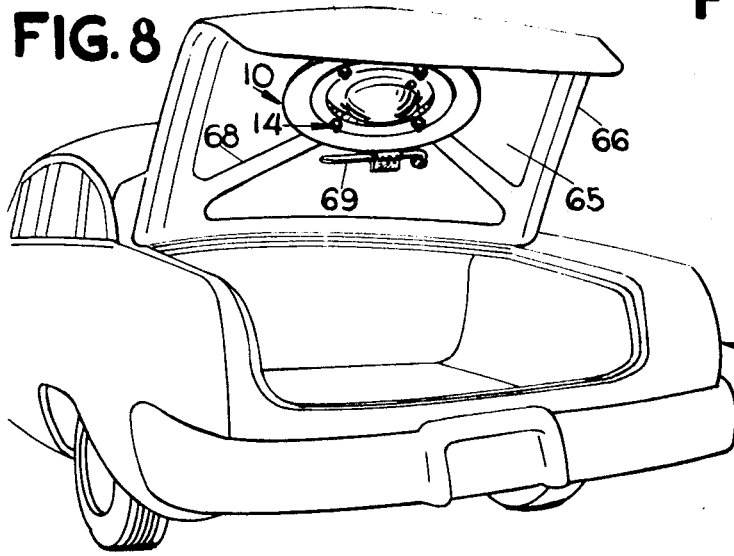
FIG. 8
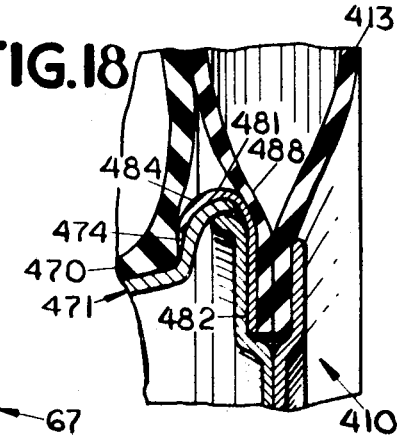
FIG. 18
INVENTOR.
William P. Stransbar

PATENTED SEP 28 1971

INVENTOR.
William P. Strumbos

INVENTOR.
William P. Stumbos

EMERGENCY WHEELS

This invention relates to emergency wheels for automotive vehicles and a method for installing such wheels and, more particularly, to a method that does not require that the vehicle be jacked up to mount the emergency wheel for use.

Emergency wheels are substitutes for the automotive spare tire (and wheel) and are intended to serve as a means for reaching a service station or other repair facility in case one of the pneumatic road tires is punctured or otherwise damaged enough to cause deflation of the tire. Although it has its drawbacks, the spare tire has accomplished its function fairly well in the past; however, the automotive trends increasingly point toward the elimination of this fifth road tire (and wheel) that has served as the spare tire. Whatever does take its place, it will be appreciated, it should not have those features which are objectionable in the conventional spare tire. One of the objections to the present spare tire is the space required for its stowage, particularly in view of the trend to smaller, more compact cars. The storage space required for the spare is not critical for casual driving, but extra space is valuable on extended trips; thus, one of the prime requirements for the replacement for the spare is that it require less space. It should also be easier to store and it should not be necessary to unload the trunk or take similar action to reach it when it is needed. An emergency tire, if it is to be of any value, must perform as many of the functions of the present spare tire as it is possible to design into it. Preferably its features should include the following basic criteria:

Minimum weight and convenient size such that it is easy to handle and requires a minimum in storage space so as to give the vehicle owner more trunk space.

Ease of application. If possible, its installation should involve no tire change, no need to jack up or raise the vehicle, and any manipulations should be limited to those capable of performance even by persons having minimum strength and mechanical aptitudes.

At least 200 miles of dependable, continuous service at reasonable speeds.

Good handling characteristics and no penalty in vehicle ride or stability.

Reusability, if needed.

Reasonable cost and maintenance expense.

In the art, replacements for the spare tire fall into four general categories. The first group includes the self-contained tires requiring no spare tire; the second, those substitutes that are mounted on the effected wheel but whose use permits the wheel and the damaged road tire to remain in place; the third, those designs whose use require the complete removal of the wheel carrying the damaged tire; and the fourth group, in which the wheel is not removed but whose wheel rim designs permit easy removal of the flat tire and installation of an emergency tire in its place.

The first group of spare tire replacements have an advantage in that no emergency wheel or the like has to be carried in the vehicle; they do not require the vehicle to be jacked up; and one of the group, the two-chamber tire, does not require that a separate source of pressurized air for inflation be carried. However, these tires present manufacturing problems and a failure of the inner diaphragm or chamber wall may result in the total loss of an expensive tire. In addition, because there is no spare, failure of the tire means that any driving has to be done on the wheel rim. The tires in this group thus are not considered to be a very realistic substitute for a spare tire. A further member of this group, the tire having a filler of closed-cell foam rubber or plastic, is not felt to be practical, at least at this time, because of cost, weight, and performance considerations.

The second group of spare tire substitutes includes those thin steel disk wheels installed next to the flat tire and other devices such as the inflatable band placed around the flat tire. In this group of devices known in the prior art, the raising or jacking up of the vehicle is required; they present difficulties in their installation; and the pneumatic types require that a source of pressurized air for inflation be carried.

All the spare tire replacements encompassed in the third group have a common requirement that the vehicle be jacked up to remove the wheel with its damaged tire. Removal of the wheel in itself presents difficulties and the pneumatic members of this group of replacements usually are carried in the uninflated state to conserve space and thus a means for their inflation must be provided. There is also the problem of where to put the vehicle road wheel with its damaged tire after it has been removed as the storage space that would be provided normally for a spare tire would not be available in a vehicle using this type of spare tire substitute. Except for some space and weight saving by not having to carry an inflated, full-sized spare tire, this group of replacements does not appear to have much to offer over the regular spare tire.

In the fourth group, the wheel is left in place, but the punctured tire is removed from the rim and it is replaced by a substitute tire that is used as a replacement. To permit easy removal of the damaged tire and the mounting of the replacement, a new design of wheel having a removable flange and different bead tapers is required. A common requirement of this class of spare tire substitutes is that the vehicles must be jacked up for them to be used and, further, that a source of pressurized air for inflation purposes must be available. And, of course, there still is the problem of storing the damaged tire after it has been removed.

Other approaches have been suggested in the prior art in addition to those outlined above, but to my knowledge the only design in the group in which the instant invention pertains which is currently in other than limited use is a member of the second group. This currently used spare tire replacement is a lightweight disk wheel carrying a thin-sectioned inflatable fold-up tire. Its use requires that the vehicle be jacked up, the wheel with its damaged tire be removed, and the replacement wheel be mounted and inflated. Thus, except for the saving of some weight and space, this presently used substitute for the spare tire does not fulfill the major desired requirements set forth above.

The present invention is intended to provide an emergency wheel which does satisfy the basic criteria set forth above.

Therefore, among the objects to be achieved by this invention are the following:

The principal object of this invention is to provide an emergency wheel whose use does not require that the vehicle be jacked up or that the vehicle road wheel or its damaged tire be removed. This invention makes it a much easier task to cope with a flat tire, and even a motorist with limited physical strength and mechanical aptitudes can get the vehicle back into operation without undue delay and without the possibility of personal injury. Also, by cutting down the time needed to get the vehicle back into operation, the exposure time of the motorist to dangerous road and traffic conditions during the enforced stop is reduced to a minimum.

Because the vehicle does not have to be jacked up to install this emergency wheel, such installation can be accomplished readily even though the vehicle is not on a firm or level surface. This emergency wheel can be installed even in mud or snow, and because a jack is not required, the possibility of personal injury because of mishaps with that implement are eliminated.

A further object is the provision of an improved emergency wheel whose design transfers most of the operating loads to the road wheel of the vehicle upon which it is mounted, thus allowing a low-cost, lightweight disk wheel construction of narrow cross section to be used for the emergency wheel.

Being light in weight and compact, the device is easy to handle and it lends itself to convenient stowage in the vehicle. When its tire is uninflated, the emergency wheel is just a few inches thick and thus may be stowed in a readily accessible location such as on the underside of the trunk lid of the vehicle. Using the trunk lid as a stowage place not only conserves valuable trunk space, but the motorist will never be placed in the position as happens with the conventional spare tire of having to unload the trunk to reach the emergency wheel.

Because the emergency wheel is installed for use on the road wheel outboard of the damaged road tire, it is not necessary to remove that wheel and tire. The motorist thus does not have to lift or otherwise handle the heavy and usually dirty road wheel and tire and does not have to be concerned about stowing the damaged tire or of the possibility of soiling the interior of the car or its contents.

When installed, the emergency wheel at reasonable speeds will make only a slight difference in the normal performance of the vehicle. Experimental versions of wheels of this type have been driven at speeds in excess of 40 m.p.h. as far as 2,000 miles with no apparent damage. Ride, stability, and general handling characteristics of the vehicle were not seriously affected. Under normal conditions of usage, these emergency wheels are durable enough to be used for emergency service throughout the life of the vehicle.

It is another object to provide an emergency wheel having a reservoir for pressurized fluid incorporated in the wheel body structure itself so that a safe, convenient source of pressurized fluid is available for inflating the tire of the emergency wheel or for any other desired use. This thereby eliminates the requirement for carrying a bottle of pressurized gas or for having to provide other means for inflation purposes.

It is an object to provide an emergency wheel that offers a cost and weight savings over the conventional spare tire and makes it possible for the vehicle designer to achieve a lower vehicle silhouette with no decrease in trunk storage space. And a further object is the provision of an improved emergency wheel whose adoption does not entail a requirement for special equipment, handling procedures, or employee training in the plant of the vehicle maker.

Still another object is to provide an emergency wheel whose ease of installation allows it to be readily utilized to increase the traction of the vehicle the embodiments whose design permits skid chains to be installed quickly or removed so that such antiskid means can be utilized conveniently only when required.

An object is to provide an emergency wheel in which the inflation of its tire not only raises the vehicle into a normal driving attitude and off the damaged road tire but the inflated emergency tire itself is utilized as an element of the locking means to retain the emergency wheel in position.

It is another object of this invention to use the pressurized fluid utilized to inflate the tire of the emergency wheel as an energy source to actuate the fasteners provided for installing the device on the vehicle road wheel such that the operation of fastening the emergency wheel in its operative position is substantially accomplished pneumatically and with a minimum of the physical exertion that is required to secure the wheel-mounting bolts or nuts of conventional emergency wheel means.

Other objects and advantages will become apparent from the following description when taken in conjunction with the accompanying drawings in which:

FIG. 6 is a view in section of valve means utilized for inflating the tire of the emergency wheel of FIG. 1;

FIG. 8 is a view in perspective of a vehicle showing the emergency wheel of FIG. 1 stowed in the inside surface of the trunk lid;

FIG. 9 is a view in fragmentary section of an embodiment of the emergency wheel having an annular wheel body;

FIG. 16 is a view in fragmentary section of an embodiment of an emergency wheel of the present invention showing the emergency wheel with its tire deflated mounted on a vehicle road wheel;

FIG. 17 is a view in perspective of a fragmentary portion of clamping means utilized to mount the emergency wheel of FIG. 16 on a vehicle road wheel;

FIG. 18 is a view in fragmentary section of the emergency wheel of FIG. 16 with its tire inflated;

Figure 1:
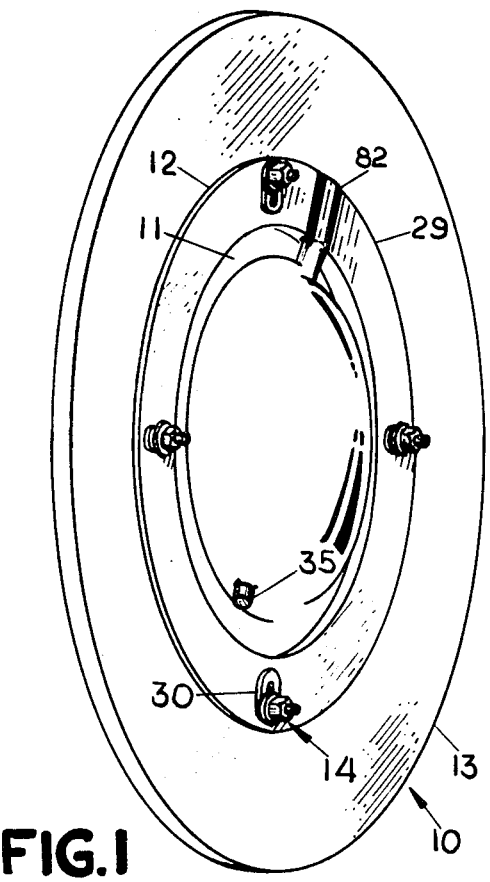
FIG. 1 is a view in perspective of an emergency wheel of the present invention.
Figure 2:
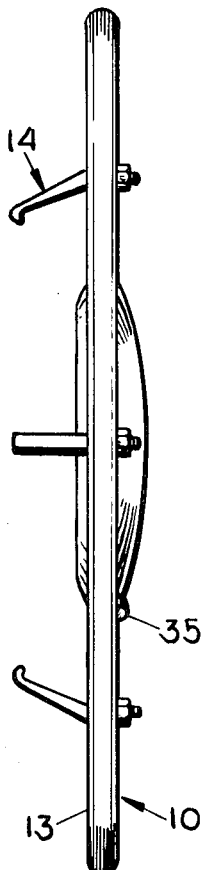
FIG. 2 is an end view of the emergency wheel of FIG. 1, showing the wheel with its tire deflated.
Figure 3:
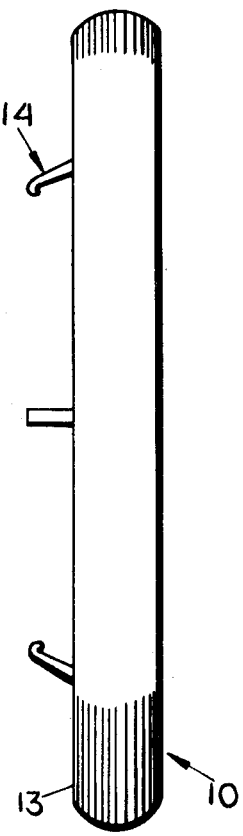
FIG. 3 is an end view of the emergency wheel of FIG. 1, showing the wheel with its tire inflated.
Figure 4:
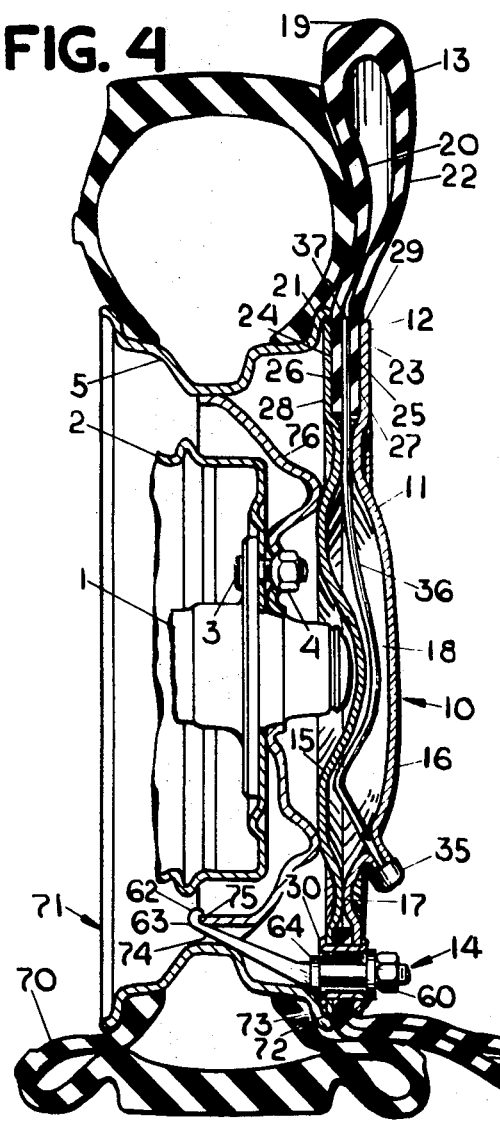
FIG. 4 is a view in section of the emergency wheel of FIG. 1, showing the emergency wheel mounted with its tire deflated on a vehicle road wheel having a flat tire.

Referring now to the drawings, FIGS. 1, 2, and 3 illustrate a preferred embodiment of an emergency wheel useful in the method of my invention. Emergency wheel 10 comprises a body or disk member 11 having a rim portion 12, a pneumatic tire 13 (shown in the unflated state in FIGS. 1 and 2, and in the inflated state in FIG. 3) and wheel mounting clamps 14. In this embodiment, disk member 11 is of a two-piece construction having an inboard disk element 15 and an outboard disk element 16 which are in peripheral contact 17 in the area radially inward from the rim, but which are in a spaced relationship in the axial portion of disk member 11 such that the space forms a chamber 18, as perhaps best shown in FIG. 4. Pneumatic tire 13 may be of any suitable light, resilient construction, preferably of a thin-section two-ply type having walls sufficiently flexible to permit the wheel to be mounted as shown in FIG. 4. I prefer to use a tire 13 having a crown 19, which may be furnished with treads (not shown) to provide traction, and an inboard sidewall 20 having a narrow "bead" portion 21 and an outboard sidewall 22 having a narrow "bead" portion 23. Outer surface 24 of bead 21 and outer surface 25 of bead 23 are bonded to inside surfaces 26 and 27 respectively of the inboard 28 and outboard 29 flanges of rim 12. Assembly of tire 13 to rim 12 is completed by a plurality of elongated grommets 30 around the rim which serve to "rivet" the inboard disk element 15 to outboard disk element 16, thus securing disk elements 15 and 16 and the tire 13 in position. It will be noted that with this arrangement the bead portions 21 and 23 trapped between the flanges 28 and 29 of the rim 12 act as sealing means around the periphery of chamber 18 which is formed between disk elements 15 and 16 such that the chamber may be used safely as a reservoir for high-pressure fluid.

Chamber 18 can be supplied with pressurized fluid, commonly air, through any suitable valve means and any suitable fluid transfer means can be provided to transfer the pressurized fluid from reservoir chamber 18 to the interior of tire 13 when it is desired to inflate the tire. I prefer to use valve means 31 such as those illustrated in detail in FIG. 6 to accomplish these functions. In the construction detailed therein, an aperture having a raised annular lip 32 is provided in disk element 16 for the inflation means. The raised lip 32 has screw threads 33 in its outer periphery engaging screw threads 34 in valve cap 35. Housed inside the lip 32 and having a press fit therewith is a conduit or tube 36 which extends across chamber 18 such that the distal end 37 of the tube lies between beads 21 and 23 of tire 13 in communication with the interior thereof. (The flanges 28 and 29 of rim 12 will, of course, be deformed locally 82, FIG. 1, to accommodate the end of tube 36.) Outer end of tube 36 is flanged 38 and the flange is brazed 39 to the outer edge of the lip 32 such that a fluid-pressure tight fit is obtained. A conventional valve 40 is provided in tube 36 for controlling the admission of pressurized fluid into chamber 18 and and a similar valve 41 in the tube controls the transfer of pressurized fluid from chamber 18 to the interior of tire 13. Valves 40 and 41 can be of the conventional "Schrader" type in common use and it is not believed that it will serve any useful purpose to describe them in detail.

Valves 40 and 41 are installed in tube 36 by means of screw threads 42 in the bore of the tube. In the assembly of the valves in the tube, a threaded sleeve 43 and a resilient valve seat 44 is first installed and valve 41 is screwed into place until valve packing 45 of the valve is in a pressuretight contact with valve seat 44. Threaded sleeve 46 and a resilient valve seat 47 is then installed and valve 40 is screwed into place until valve packing 48 of the valve is in a pressuretight contact with valve seat 47. Valve 40 is located relative to the end of tube 36 such that the end 49 of valve pin 50 is positioned properly for use with conventional tire inflation equipment. As is known, when valve pin 50 is depressed by such inflation equipment, valve 40 is opened for the passage of fluid through the valve in the direction of arrow 51. If valve 41 is closed, as it will be when chamber 18 is being filled by means of the inflation equipment, fluid through valve 40 will pass through openings 83 and 52 in the walls of sleeve 46 and tube 36 respectively into chamber 18 to thus fill that chamber with fluid under pressure.

Valve cap 35 is the means used to open valve 41 to inflate tire 13. This function is accomplished by screwing down cap 35 to cause the end of stem 53 located inside the cap to depress valve pin 50. As stated above, when pin 50 is depressed by the fitting of the inflation equipment (not shown) valve 40 is opened to allow chamber 18 to be filled with pressurized fluid. However, when cap 35 is screwed down, stem 53 depresses valve pin 50 past this normal inflation position such that its end 54 comes into contact with the end 55 of valve pin 56 of valve 41. Screwing cap 35 down further causes valve pin 50 to depress valve pin 56 to open valve 41, thus allowing pressurized fluid to flow through openings 52 and 83 and through valve 41 in the direction of arrow 57. This pressurized fluid passing through valve 41 flows through the tube into the interior of tire 13 to thereby inflate it. There will be a backflow of fluid through valve 40 when its pin 50 is thus depressed, of course, but cap 35 will prevent any appreciable loss of this fluid. It will be seen, therefore, that cap 35 is removed to allow the filling of chamber 18 and then reinstalled; then, all that is required to inflate tire 13 of the emergency wheel is to screw down cap 35 to the limit of its travel.

Figure 7:
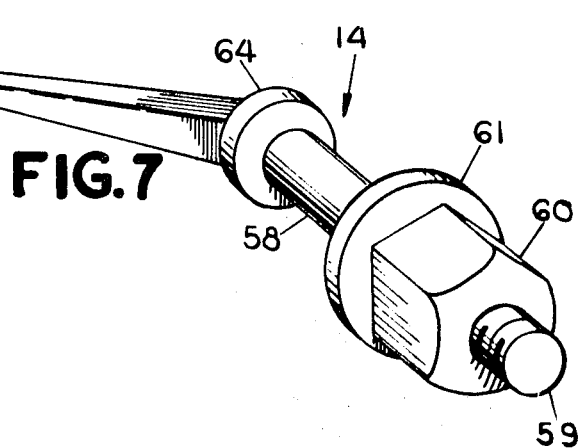
FIG. 7 is a view in perspective of a clamp used to mount the emergency wheel of FIG. 1 on a vehicle road wheel.

Emergency wheel 10 is installed for operation by means of a plurality of wheel-fastening means, preferably of a design similar to wheel-mounting clamps 14. As perhaps best shown in FIG. 7, each mounting clamp 14 comprises a shank 58 having a straight, threaded end portion 59 for nut 60 and flat washer 61. The end of clamp 14 opposite its threaded end is of a substantially rectangular cross section having a hooked-portion 62 in end 63. Hooked-portion 62 of the clamp is adapted to engage the vent openings of the vehicle road wheel, thus the configuration of the hooked port and body of the clamp will be governed by the design of the vehicle road wheel with which the device is used. It will be appreciated, therefore, that the design of the clamp shown herein is only representative of the design that can be used.

As shown in FIG. 4, the mounting clamps 14 each are positioned in the central opening of a grommet 30 with hooked portion 62 of the clamp located on the inboard disk element 15 side of the wheel. Appropriate means such as a shoulder 64 on shank 58 can be provided to retain clamp 14 in position on the wheel 10 so there is no danger of the clamp being lost prior to its being required for use. A pattern of four mounting clamps 14 evenly distributed in the grommets 30 around the rim 12 of the emergency wheel 10 is illustrated in FIGS. 1, 2, and 3, but it is obvious, of course, that a greater or lesser number of mounting clamps can be utilized if required.

The emergency wheel of this invention can be used to maintain the operativeness of any wheeled vehicle having pneumatic tires. Thus, although the invention is illustrated herein as being employed with a motor car, the showing of such use is not to be construed as a limitation to such usage. Referring to FIG. 4, reference numeral 1 designates the spindle or axle member of any suitable known construction of an axle for a motor vehicle which carries in a well-known manner a brake drum 2 to which the body 76 of the vehicle road wheel 71 is secured as by means of wheel studs 3 and nuts 4, also in a known manner. Welded to wheel body 76 is a conventional drop center rim 5 upon which is mounted in the usual way a tire 70 of any suitable construction. The tire 70 shown is of the tubeless type, but it is obvious that this invention can be used with other types of pneumatic tires, such as those furnished with inner tubes.

In the utilization of the preferred embodiment described above, the device is stowed convenient for use in a suitable place in the vehicle. Because of its lightweight construction, the stowage position can be the inside surface 65 of the trunk lid 66 of the vehicle 67 as shown in FIG. 8. If suitable recesses (not shown) are provided in the structural members 68 of the trunk lid, mounting clamps 14 can be utilized to secure the emergency wheel in its stowed position. Reservoir 18 of the wheel can be filled with fluid under pressure either before or after the tire is stowed. Air will be the fluid most commonly used for inflation purposes; however, should the reservoir be filled with carbon dioxide and a suitable hose and fittings (not shown) be provided, the reservoir can serve as a source of fluid for fire extinguishing. It is also feasible to charge the reservoir with an excess of pressurized air such that, if a suitable hose is provided, the reservoir can be drawn upon to maintain a correct level of pressure at all times in all of the road tires.

Figure 5:
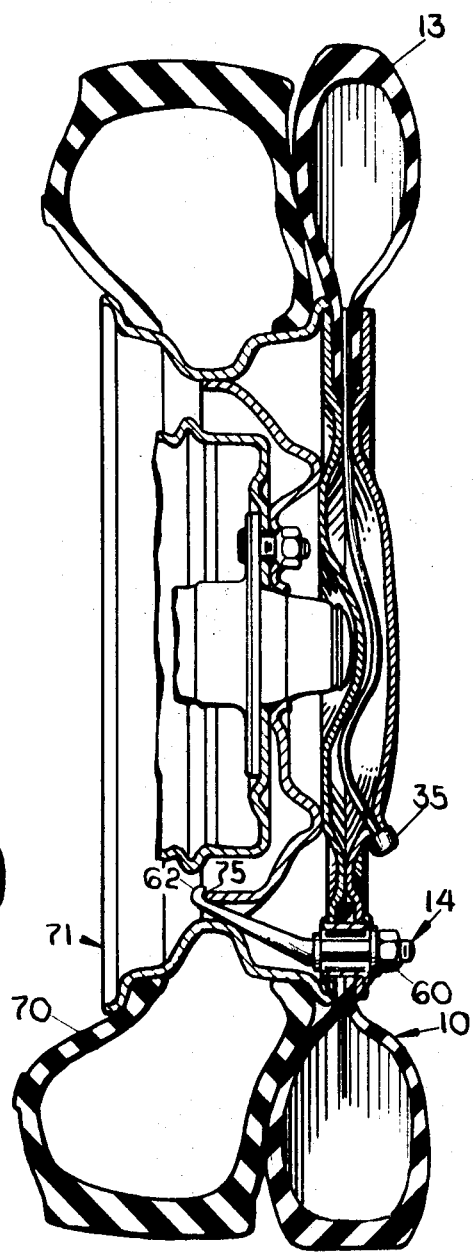
FIG. 5 is a similar view of the emergency wheel of FIG. 4 with its tire inflated.

In operation when a blow-out or puncture of a road tire has occurred, the vehicle is brought to a stop. The vehicle should be brought to a halt out of the way of traffic or of any potentially hazardous situation, of course, but it is not necessary that it be stopped on a level or even a firm surface. The emergency wheel 10 and the wheel wrench 69 should be removed from their stowage place and, if the wheel cover (not shown) of the wheel with the damaged tire 70 is of a type having protruding parts, the wheel cover should be removed. Emergency wheel 10, with hooked ends 63 of the wheel clamps 14 facing the vehicle wheel 71 having the damaged tire should be placed against wheel 71 with the lip 72 of the inboard flange 28 of the rim 12 of the emergency wheel nesting under the wheel rim flange 73 of wheel 71. The hooked ends 63 of the wheel clamps 14 of the emergency wheel should be inserted into the ventilation openings 74 of wheel 71 and the hooks 62 engaged on the flanged portion 75 of the road wheel body 76. (The lower portion of the tire 13 of the emergency wheel 10 should be positioned with the part of the tire closest to the ground extended outward away from the vehicle road wheel 71 and tire 70 such that tire 13 is free for unimpeded distention when it is inflated.) Nuts 60 of clamps 14 should then be turned down to pull emergency wheel 10 firmly against road wheel 71 (see FIG. 4) and the wheel wrench 69 used to insure that the nuts are properly tightened. After the nuts 60 are securely tightened, tire 13 of the emergency wheel is inflated by simply screwing down valve cap 35, thus opening valve 41 as described previously to transfer pressurized fluid from reservoir 18 to the tire 13. Inflating tire 13 raises the vehicle into the operative position with the load off damaged road tire 70 (see FIG. 5) so the vehicle can be driven safely at reasonable speeds without damage to that tire. Once emergency tire 13 is inflated, of course, and wrench 69 put away, the vehicle can be driven away immediately with no further action being required by the operator. It will be obvious that the tire 13 of the emergency wheel will deflect to some extent under the weight of the vehicle, thus causing vehicle tire 70 to be forced inward in the direction of the vehicle structure. There is a possibility that this action may lead to interference with the vehicle structure. However, this interference can be minimized by utilizing a design and construction for the emergency tire that will keep tire deflection at a minimum. The design and construction of low-deflection tires are well known in the art and any suitable version of such tires can be utilized in this invention. Also, inasmuch as the point of greatest deflection or flexing of a tire is at the road surface where there is substantially unlimited clearance, the sideward displacement of the tire 70 because of the flexing of tire 13 is not likely to present an appreciable interference problem. Of course, when this emergency wheel is to be used on vehicles having wheel cutouts in the vehicle body that are larger than the area occupied by the road wheel and tire, even in conditions of maximum rebound, the tire 13 can be designed so that substantially all its deflection is confined to the outward direction such that the possibility of its forcing tire 70 inward to interfere with vehicle structure is minimized. A design expedient that can be employed to obtain an outward deflection of tire 13, of course, is to use an outboard tire sidewall 22 of lesser thickness than inboard sidewall 20. After service facilities are reached, the vehicle can be jacked up and the emergency wheel 10 and the road wheel 71 removed. After the damaged tire 70 is repaired or replaced, the tire 13 of the emergency wheel 10 can be deflated and the reservoir 18 refilled such that the wheel can be stowed away ready to be reused.

Although emergency wheel 10 utilized in the method of my invention is of a preferred type having a full wheel disk, the method can be practiced with other suitable wheel designs. For example, instead of a wheel having a full disk, an annular disk can be utilized in the interest of weight and space savings. As indicated in FIG. 9, such an annular emergency wheel 110 comprises an annular disk member 111 having a rim portion 112, a pneumatic tire 113, and wheel-mounting clamps 114. In this embodiment, annular disk member 111 is of a one-piece construction formed into a hollow ring shape having an inboard wall 115 and an outboard wall 116 which are in peripheral contact 117 in the area radially inward from the rim 112. The interior of the hollow ring thus forms a chamber 118. Lightweight tire 113 can be of identical construction as the tire of the previously described emergency wheel 10. It too has outer surface 124 of bead 121 and outer surface 125 of bead 123 bonded to inside surfaces 126 and 127 respectively of the inboard 128 and outboard 129 flanges of rim 112. A plurality of elongated grommets 130 around rim 112 "rivet" flanges 128 and 129 of the rim 112 together with the tire beads 121 and 123 trapped therebetween. As before, the trapped portion of the tire sets to seal the periphery of chamber 118 such that it may be used as a reservoir for high-pressure air.

Chamber 118 can be supplied with pressurized air by any suitable means (not shown), preferably using the valve means described for emergency wheel 10. As it would serve no useful purpose to repeat that description, reference should be made to thereto for such explanatory description.

Figure 10:
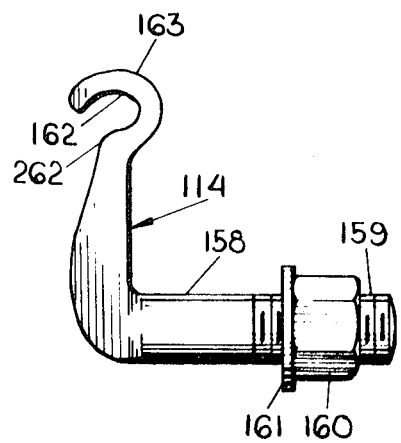
FIG. 10 is a side view of a clamp used to mount the emergency wheel of FIG. 9 on a vehicle road wheel.

Emergency wheel 110 is installed for operation by means of a plurality of wheel mounting fasteners or clamps 114. The wheel mounting clamps can be similar to clamps 14 of emergency wheel 10 which engage in the vent openings of the vehicle road wheel disk, but it is obvious that the clamps can be designed for engagement with the wheel rim flange 173 of the wheel 171 having the damage tire. Thus, each clamp 114 (FIG. 10) comprises a shank 158 having a straight, threaded end portion 159 for nut 160 and flat washer 161. The hook end portion 163 of the clamp has a flattened rectangular cross section and is of a compound-curved shape with a hook portion 162 and a curved portion 262 adapted to fit under the outside surface of road wheel rim flange 173.

The mounting clamps 114 are positioned in the central openings of grommets 130, one to a grommet, with the hooked 162 end of the clamp located on the inboard wall 115 side of the wheel 110. An appropriate number of mounting clamps 114 is provided in an evenly distributed pattern around the rim of the emergency wheel—the number used and the distribution should insure that the emergency wheel is rigidly secured to the vehicle road wheel 171.

In operation, emergency wheel 110 is utilized in an identical manner as emergency wheel 10 described previously. When a puncture has occurred, the vehicle is brought to a stop and the wheel cover is removed from the effected wheel. The emergency wheel 110 and the wheel wrench are taken out of their stowage position and the wheel is placed against the vehicle wheel 171 having the damaged tire 170 and hooks 162 are hooked on the rim flange of that wheel. Nuts 160 of claims 114 are turned down to pull emergency wheel 110 firmly against vehicle wheel 171 and the wheel wrench is used to insure that the nuts 160 are securely tightened. The valve cap (not shown) is tightened down, thus inflating tire 113. This raises the vehicle into the operative position and it can then be safely driven at reasonable speeds until service facilities where the damaged road tire can be repaired are reached.

The method of this invention resides in the technique of mounting an emergency wheel with its pneumatic tire in the deflated condition outboard of the vehicle road wheel having the damaged tire and then inflating the tire of the emergency wheel to raise the vehicle off the damaged road tire so the vehicle can be driven safely. Thus, although the above-described embodiments of the emergency wheels utilized in the method of my invention are of a preferred type having means such as pressurized air reservoir and quick-mounting clamps and the like to facilitate their use, it will be appreciated that this method can be practiced with any suitable wheel having a suitable inflatable tire and suitable wheel mounting means. For example, if the road wheels of the vehicle are provided with the elongated mounting bolts disclosed in U.S. Pat. No. 2,823,956, granted to H. Gray, emergency wheels known in the art, such as the "Standby Wheel," produced by the Dunlop Tire & Rubber Corp., Buffalo, N.Y., or the pneumatic "Perma Spare," produced by The Firestone Tire & Rubber Company, Akron, Ohio, can be suitably employed in the method of my invention. If these conventional emergency wheels known in the art are employed in my method, a $CO_2$ bottle or other fluid supply for inflating the tire will be needed. It will be appreciated that, inasmuch as the method of my invention involves the step of mounting the emergency wheel with its tire deflated over the vehicle road wheel having the damage tire, it is essential that the emergency tire be sufficiently flexible to allow such mounting to be accomplished successfully in spite of limited clearance and in spite of the obstruction offered by the flattened portion of te road tire. Any suitable means known in the art can be employed to give the emergency tire the requisite flexibility for use. Such means can encompass, for example, the use in at least one of the sidewalls of the emergency tire of an annular area of reduced wall thickness concentric with the rim of the wheel, or any other suitable design expedient can be employed.

Figure 11:
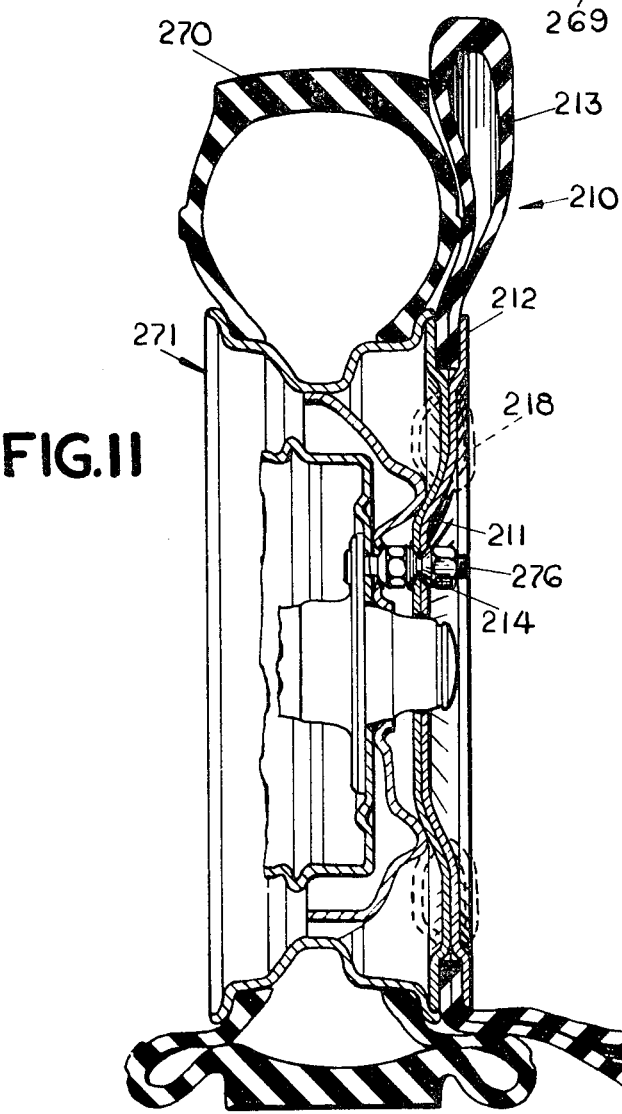
FIG. 11 is a view in section of an embodiment of an emergency wheel of the present invention showing the emergency wheel with its tire deflated mounted on vehicle road wheel having a flat tire.

An embodiment of this invention that can be considered to be typical of the type of emergency wheel that can utilize the elongated mounting bolts disclosed in the above-referenced Gray patent is illustrated in FIG. 11 mounted on a vehicle road wheel 271 having a damaged road tire 270. As shown, emergency wheel 210 comprises a wheel body or disk 211 having a rim portion 212, and a lightweight narrow-section pneumatic tire 213. Wheel disk 211 can have a pattern of mounting holes matching the vehicle wheel stud 276 pattern and a set of emergency wheel nuts 214 can be provided for securing the emergency wheel 210 in place on those studs; however, it is preferred if the emergency wheel nuts 214 are loosely clinched on the disk 211 such that they are "trapped" thereon in a manner that leaves them free to rotate so they can screw on the elongated ends of the vehicle wheel studs. It will be obvious, of course, that the "trapped" nuts will be arranged in a pattern that matches the vehicle wheel studs 276. Suitable inflation means for tire 213 such as conventional valve means (not shown) is provided to allow the tire 213 of the emergency wheel to be inflated, preferably by means of a $CO_2$ bottle.

Figure 12:
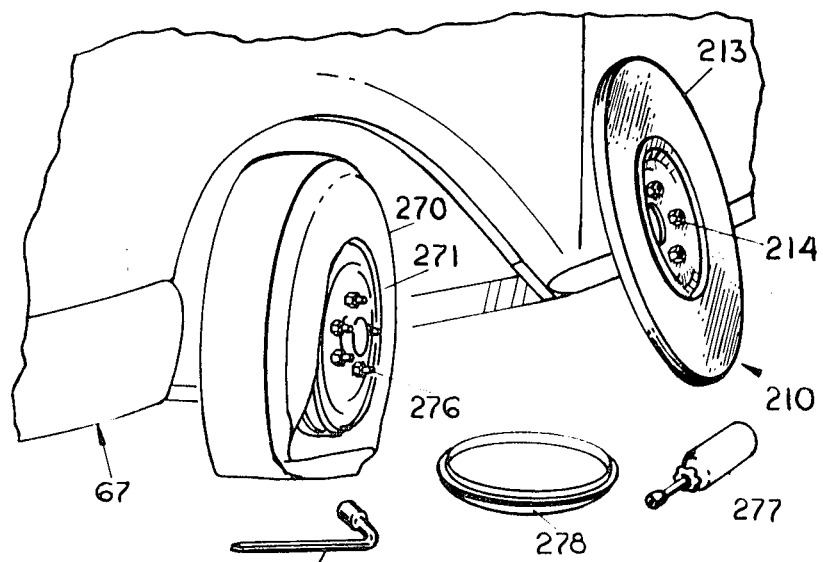
FIG. 12 is a view in perspective of a vehicle showing the emergency wheel of FIG. 11 preparatory to its being mounted on a vehicle road wheel having a flat tire.

In operation, the vehicle is brought to a stop and the wheel cover 278 is removed from the vehicle wheel 271 having the damaged tire 270, as best shown in FIG. 12. Emergency wheel 210 is brought out of its stowage position and positioned against the vehicle wheel 271 and emergency wheel nuts 214 are piloted on the projecting ends of the vehicle wheel studs 276. Using the wheel wrench 269, the nuts 214 are tightened to draw the emergency wheel 210 securely into position against the vehicle wheel 271 outboard of te damged tire 270. All that remains to be done is to inflate the tire 213 of the emergency wheel 210 by means of $CO_2$ bottle 277 and the vehicle can be driven safely away. It is obvious, of course, that if a reservoir 218 (as shown in broken lines in FIG. 11) is provided in the disk structure 211 of the emergency wheel, the requirement for tire inflation bottle 277 will be eliminated.

Figure 13:
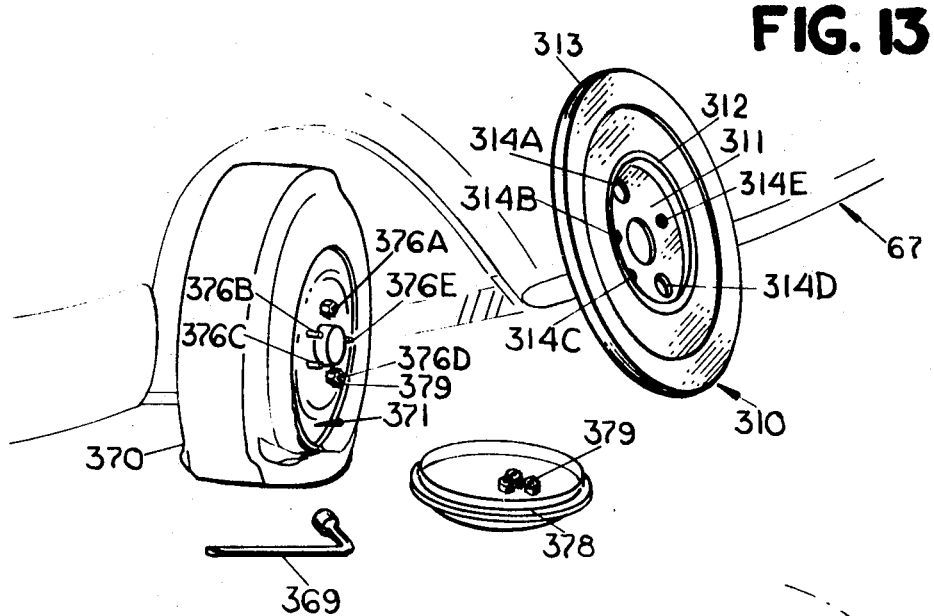
FIG. 13 is a view in perspective of a vehicle showing an embodiment of an emergency wheel of the present invention preparatory to its being mounted for use.

An emergency wheel 310 that is adapted to utilize the wheel nuts that are provided conventionally to mount the road wheels in common use is illustrated in FIG. 13. Emergency wheel 310 comprises a wheel disk 311 having a rim portion 312, and a light, narrow-section pneumatic tire 313. Except for the mounting hole pattern, the wheel can be of any known design suitable for the purpose. A mounting hole 314A through E pattern matching the vehicle wheel studs 376A through E is provided in wheel disk 311. Three of the mounting holes 314B, C, and E are a clearance fit over the wheel studs 376B, C, and E when their associated wheel nuts 379 are removed; mounting holes 314A and D are large enough to fit over the vehicle wheel studs 376A and D with their nuts 379 installed. A suitable valve (not shown) is provided to allow the emergency tire 313 to be inflated, preferably by means of a $CO_2$ bottle 377.

Figure 14:
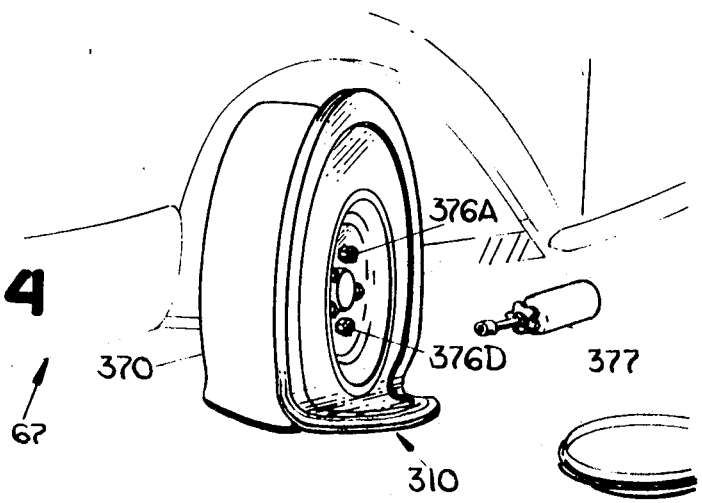
FIG. 14 is a view in perspective of a vehicle showing the emergency wheel of FIG. 13 mounted with its tire deflated on the vehicle road wheel.
Figure 15:
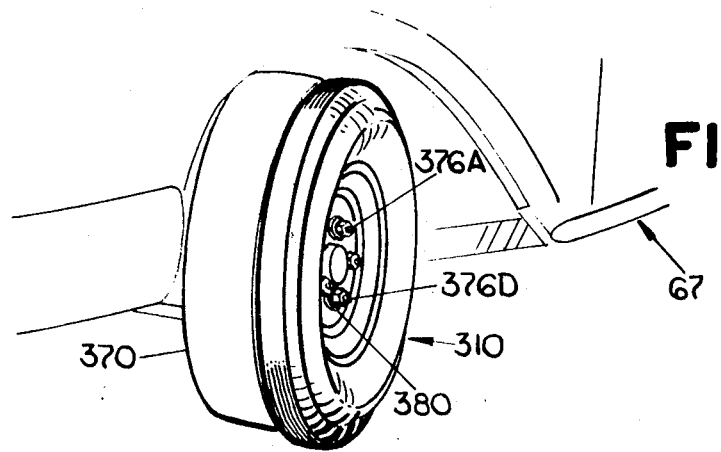
FIG. 15 is a view in perspective of a vehicle showing the emergency wheel of FIG. 13 with its tire inflated.

In operation, when a blowout or puncture of a road tire has occurred, the vehicle should be brought to a halt in a suitable place. After the wheel cover 378 is removed from the vehicle wheel 371 having the damaged tire 370, the wheel nuts 379 are removed from vehicle wheel studs 376B, C, and E using wheel wrench 369. It will be appreciated that wheel nuts 379 which remain in place on wheel studs 376A and D retain the vehicle wheel securely in position. Then, with mounting holes 314A and D piloted on the nuts on wheel studs 376A and D, and mounting holes 314B, C, and E located over wheel studs 376B, C, and E respectively, the emergency wheel is pushed into position with its inboard rim nesting inside the rim flange of the vehicle wheel. Wheel nuts 379 are installed on studs 376B, C, and E and are tightened to lock the emergency wheel 310 against the road wheel 371 as shown in FIG. 14. (If additional security of installation is desired, the wheel nuts on wheel studs 376A and D can be taken off, flat washers 380 of a size sufficient to bridge the oversized mounting holes 314A and D are placed on wheel studs 376A and D, and the wheel nuts 379 reinstalled and then tightened securely.) The tire 313 of the emergency wheel 310 is then inflated with pressurized fluid from bottle 377 to raise the vehicle into an operative position (FIG. 15).

It will be noted that the ease of installation makes it feasible to extend the use of the emergency wheel to functions outside of its employment as an aid when a road tire has been damaged. For example, the emergency wheels can be used to increase the traction of the vehicle when driving through mud, sand, snow, and the like. For maximum effectiveness, of course, each of the vehicle's wheels can be provided with an emergency wheel, although it normally will suffice to mount the emergency wheels on the rear wheels only of the vehicle. Of course, should the vehicle be provided with a limited-slip differential, the use of even a single emergency wheel will increase the tractive effort of the vehicle.

For severe service, the emergency wheel can be adapted to accommodate skid chains and similar traction enhancing means. The chain would be designed to fit securely around the periphery of the emergency wheel after its tire has been inflated. To mount the skid chain for use, the emergency wheel is mounted outboard of the vehicle road wheel and the emergency wheel tire is partially inflated. The chain then is slipped into position and the inflation of the tire is completed. It will be appreciated that the ease of installation provided by my method allows considerable freedom in the design of suitable inexpensive skid chains or other antiskid elements.

Because of their ease of installation the emergency wheels of this invention can serve in a standby capacity and can be put into service when it is required to increase the tractive effort of the vehicle. It will not be necessary, therefore, to mount snow tires and the like prior to a trip just to make sure that, in the event they are required, the increased traction they provide will be available. Thus, the added cost involved in the purchase and installation of snow tires, and the harsh ride, noise, and rapid wear experienced when such tires have to be driven, as they usually are, on bare pavement are avoided.

It will be appreciated that the utility of my invention is enhanced because in most versions of the emergency wheels embodied in my invention, it is required to tighten only a few nuts to install the emergency wheel. Obviously, even a person of limited strength can tighten the nuts sufficiently to retain the emergency wheel safely in position until repair facilities are reached. On the other hand, it may be impossible for the same person to "break loose" and remove any of the road wheel nuts as is required in conventional spare tires and emergency wheels and in the embodiment illustrated in FIGS. 13 through 15. Even in the embodiments of my emergency wheel having clamping means for their installation, it would be desirable to keep the number of clamps used to a minimum so that the time and effort involved can be reduced. Of course, if the number of clamps furnished for mounting the wheel is reduced, the requirements of safety necessitate that other means be provided to insure the integrity of the installed emergency wheel under all driving conditions.

Wheel securing means meeting the necessary requirements are shown (mounted on vehicle road wheel 471) in FIGS. 16 and 18. As shown, the wheel 410 is identical in construction with the emergency wheel 10 except that latching ring 481 is provided. Ring 481 has a flat annular body portion 482 and is compoundly curved over at 483 such that the ring in cross section is shaped like a question mark with the curved end 484 having a hooklike configuration. To provide the necessary flexibility, ring portion 485 may be slotted 486 around its periphery such that a plurality of arcuate fingers 487 are formed (see FIG. 17). Ring 481 may be made of spring steel or other suitable material and its body portion 482 is interposed between outer surface 424 of tire bead 421 and inside surface 426 of inboard flange 428 of rim 412 of wheel 410. Body portion 482 can be bonded or otherwise secured immovably in place. The inboard sidewall 421 of tire 413 has a thinned-out annular area 488 in operative proximity of curved portion 483 of the latching ring 481 such that when tire 413 is inflated, the thinned-out area 488 bulges outwardly to apply a force on the adjacent area of the latching ring.

In operation, when emergency wheel 410 with its tire 413 in the deflated condition is mounted on the vehicle wheel 471 having the damaged tire 470, the lip 473 of the inboard flange 428 of the emergency wheel will be nested under the wheel rim flange 474 of the vehicle wheel 471. The mounting clamps (not shown) of the emergency wheel are fastened to secure the emergency wheel in the position shown in FIG. 16. When the tire 413 is inflated to raise the vehicle into its proper operating attitude, the bulging action of the thinned-out area 488 of the tire forces the hooked end 484 of the latching ring 481 into a clamping engagement with the rim flange 474 of vehicle wheel 471 (see FIG. 18).

Figure 19:
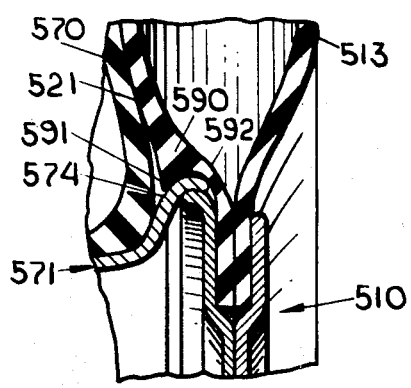
FIG. 19 is a similar section of a modified form of the invention.

It is also feasible, of course, to incorporate the latching ring in the structure of the tire itself, as in the embodiment of the tire 513 of emergency wheel 510 shown in its operative position on the vehicle road wheel 571 in FIG. 19. As shown, inboard sidewall 521 of tire 513 has an annular section 590 having a projecting contour 591 that serves the same function as the latching ring 481 of emergency wheel 410 described above. Tire 513 can have annular thinned-out areas 592 or other means well known in the art to cause it to be displaced in the direction desired when it is inflated. As shown in FIG. 19, when emergency wheel 510 is mounted and its tire 513 inflated, the projecting contour 591 is forced into a clamping engagement with the rim flange 574 of vehicle road wheel 571.

Figure 21:
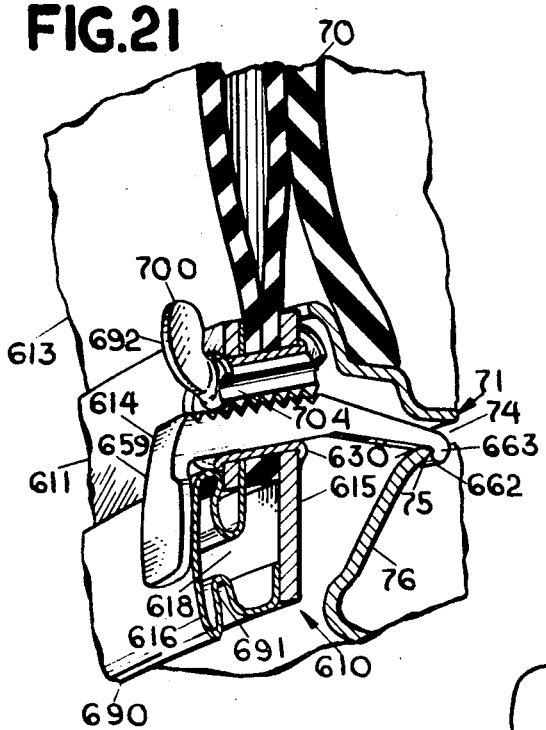
FIG. 21 is a fragmentary perspective view partially in section of an embodiment of an emergency wheel of the present invention showing the device with its tire deflated mounted on a vehicle road wheel prior to the tightening of the clamping means.

It will also be appreciated that the pressurized air used to inflate the tire of the wheels of this invention represents a convenient source of energy that can be utilized to do useful work. Thus, this energy can be used as described above to actuate a latching ring as shown in the embodiments in FIGS. 16 and 19, or it can be used perhaps more directly to actuate fastening means more akin to conventional wheel mounting fasteners. Such pneumatically actuated fastening means are shown in FIG. 21. As shown, emergency wheel 610 utilizing such fastening means is substantially identical in construction with other embodiments previously described except that inflatable means 690 is provided for actuating the clamplike fasteners 614. Inflatable actuating means 690 can be of any known suitable type having a chamber 618 that can be use to contain high-pressure fluid and having at least one of its exterior walls 616 provided with a suitable construction such that at least a portion of that wall can be displaced pneumatically by the pressurized fluid in the chamber 618. Wall member 615 of wheel body 611 can be stabilized under pressure by having a structure of a heavier or more rigid construction that wall 616 and that wall can have bellowslike corrugations 691 or other suitable means to permit least a portion of the wall 616 to be displaced under pressure. Suitable valve means (not shown) can be provided to fill chamber 618 with air under pressure.

Figures 26, 27:
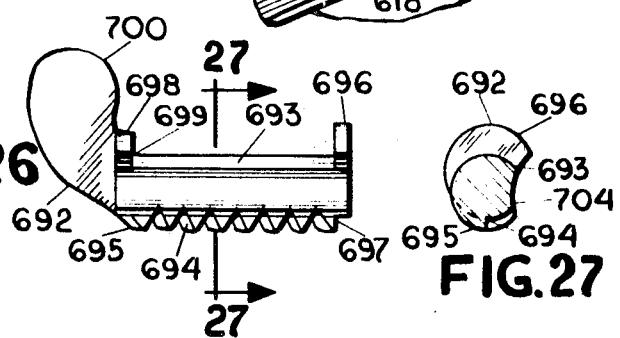
FIG. 26 is a side view of the locking means used with the clamp of FIGS. 21 through 24.
FIG. 27 is a cross-sectional view of the shank of the locking means of FIG. 26.

Emergency wheel 610 is installed for operation by means of a plurality of wheel mounting fasteners or clamps 614. Each of those clamps comprises a shank 658 having a flanged end portion 659 at an angle therewith and associated with the displaceable portion of wall 616 (see FIG. 21). The opposite end 663 of clamp 614 is provided with a hooked portion 662 or any other suitable road wheel structure-engaging means. A racklike series of threads 660 is provided in one side 661 of shank 658. Associated with clamp 614 when it is assembled in the central opening of an elongated grommet 630 is a locking means 692 (FIG. 26) which has a shank portion 693 having a circular cross section as shown in FIG. 27. A racklike series of threads 694 matching threads 660 of clamp 614 is provided in one side 695 of shank 693. When assembled in grommet 630, the locking means 692 is trapped in place by a circular shoulder 696 in one end 697 and a similar shoulder 698 in the other end 699 of its shank such that it has pivotal but not axial movement. A tab 700 is provided for rotating manually the lock 692. The shank 693 of the locking means has a longitudinal cutaway portion 704 in one side; this relieved portion of the shank furnishes the necessary clearance to permit axial movement of the clamp 614 when it is in its unlocked condition.

To prepare the fastening means for operation, clamps 614 and locks 692 are assembled in grommets 630 with chamber 618 in the unpressurized condition. The description that follows will be confined to only the clamp and lock of one of the fastening means, but it will be understood that the same description serves for each of the other fastening means provided to mount emergency wheel 610 on the vehicle road wheel. Lock 692 is rotated so that the tab 700 lies in a plane substantially parallel to the periphery of the wheel rim 612 such that threads 694 of the lock come out of engagement with the threads 660 of clamp 614. The clamp is thus unlocked and cutaway portion 704 of the lock provides enough clearance such that the clamp can then be pushed in towards the wheel body 611 so that flange portion 659 forces the wall 616 of the chamber 618 inward as far as it will compress. Lock 692 is rotated so the plane of the tab 700 lies in a radial plane intersecting the wheel axis to thereby lock clamp 614 against axial movement. Chamber 618 is then filled with air under the desired pressure.

Figure 22:
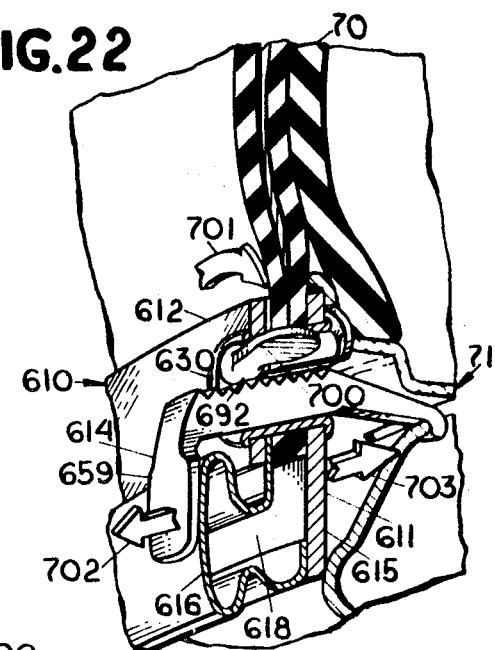
FIG. 22 is a similar view of the emergency wheel of FIG. 21 with the clamping means tightened.
Figure 23:
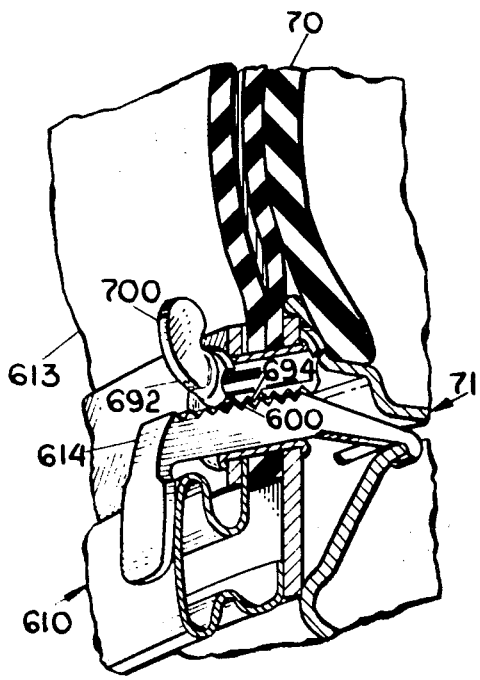
FIG. 23 is a similar view of the emergency wheel of FIG. 21 with the clamping means tightened and locked.

In operation, to mount emergency wheel 610 for use, it is placed with the hooked-end portion 663 of the clamps facing inward against the vehicle road wheel 71 having a damaged tire 70. (If wheel 71 has a hub cap or wheel cover it should be removed before the emergency wheel 610 is mounted.) Hooks 662 are then inserted into the ventilation openings 74 of wheel 71 and engaged on the flanged portion 75 of the road wheel body 76 (FIG. 21). Locks 692 are rotated in the direction of arrow 701 to unlock clamps 614. When the clamps are unlocked, wall 616 is free to dilate outward because of the pneumatic pressure in chamber 618 as shown by directional arrow 702 in FIG. 22. However, wall 616 is restrained against any substantial movement by the flange end 659 of clamp 614 and the clamp in turn, is restrained from movement because it is hooked into the wheel structure. Thus, expansion of chamber 618 forces wall member 615 and wheel body 611 inward, as shown by the directional arrow 703, securely against road wheel 71. To lock the clamps 614 and thus insure that emergency wheel 610 is installed securely, the locks 692 are rotated into the locked position as shown in FIG. 23. The mechanical advantage offered by threads 694 of the 692 acting against threads 660 of the clamps 614 insures that the clamps are drawn up tightly. After the clamps 614 are locked to insure the secure installation of the emergency wheel on the vehicle road wheel, the tire 613 can then be inflated to raise the vehicle off the damaged road tire such that it can be driven safely. If the valve means 31 used with emergency wheel 10 are provided in the reservoir 618, the pressurized fluid in that reservoir can be used to inflate tire 613. This supply of pressurized fluid employed to actuate the fasteners used to mount the emergency wheel is a convenient source of pressurized fluid for inflating the tire of that wheel; however, it is obvious that any other suitable supply of fluid can be used for that purpose.

It will be obvious that the inflatable means used to actuate the fastening means pneumatically can vary from that described above and still be encompassed within the scope of this invention. For example, should the fluid reservoirs disclosed in the emergency wheel embodiments of FIGS. 1 and 9 be designed such that portions of their wall members could expand under pressure, those reservoirs could be utilized to actuate pneumatically fastening means similar to those described above for wheel 610. Also, should the pneumatic actuating means be designed to expand radially, they could act against handles of clamping means such as those disclosed in U.S. Pat. No. 2,989,347, granted to L. Schmid, to thereby rotate the handles and thus actuate the clamping means.

Figures 24, 25:
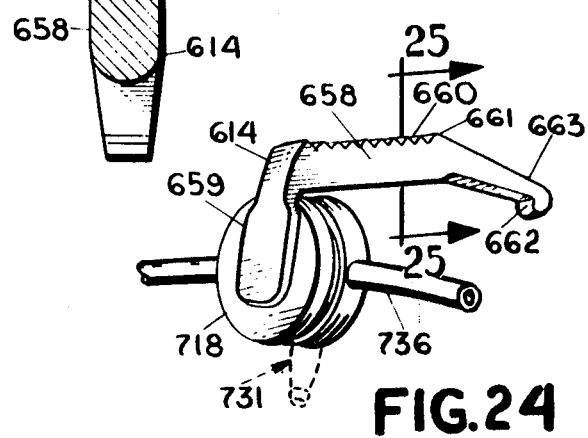
FIG. 24 is a view in perspective of a modified form of inflatable means used to actuate the emergency wheel mounting clamps.
FIG. 25 is a cross-sectional view of the shank of the clamp of FIGS. 21 through 24.

It is also obvious that, instead of a single actuating means such as the annular configuration shown in FIG. 21, that individual actuating elements can be provided for each of the fastening clamps. One such suitable design is shown in FIG. 24 in which the clamp 614 is actuated by an individual expansible bellows unit 718 acting against clamp flanged end portion 659. Each bellows unit can be supplied with pressurized air by means of a valve 731 (shown in broken lines) or can be connected with the other individual bellows units to a common source (not shown) pressurized air by suitable means such as conduits 736. In view of the description given above for the actuating means of emergency wheel 610, the operation of the individual bellows units will be obvious and a further description is not believed necessary.

Figure 20:
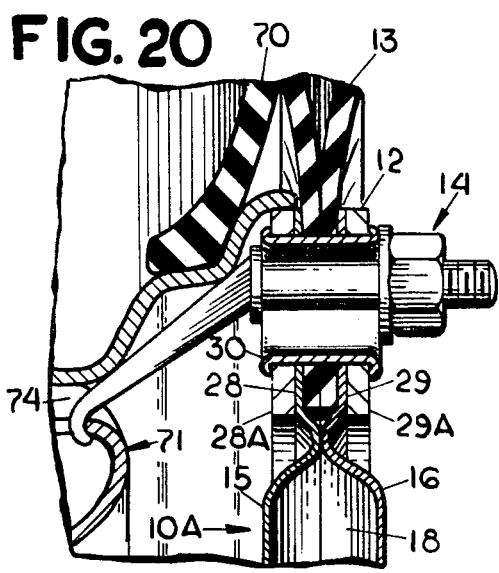
FIG. 20 is a similar section of still another modified form of the invention.

In the embodiments of the emergency wheels of my invention which utilize clamping means to secure the emergency wheel to the vehicle road wheel vents or rim, such as the embodiments of FIGS. 1 and 9, most of the loads are transferred through the clamping means to the vehicle road wheel. Because most of the loads are taken by the vehicle road wheel, it is thus feasible to utilize a lighter construction for the body or disk of the emergency wheel. The resulting lightweight emergency wheel is thus easier to use and to stow after use. As shown in FIG. 20, the emergency wheel 10A is essentially similar to the embodiment of wheel 10 as shown in FIG. 4 with the exception that in disk element 15 and outboard disk element 16 can be made of an inexpensive grade of light gauge metal whose physical requirements are largely confined to having enough strength to withstand the fluid pressure imposed on reservoir 18. If required, reinforcing rings 28A and 29A can be provided to stiffen inborad 28 and outboard 29 flanges of rim 12. In all other respects wheel 10A is essentially similar to wheel 10.

Although shown and described in what is believed to be the most practical and preferred embodiments, it is apparent that departures from the specific constructions shown will suggest themselves to those skilled in the art and may be made without departing from the spirit and scope of the invention. I, therefore, do not wish to restrict myself to the particular constructions illustrated and described, but desire to avail myself of all modifications that may fall within the scope of the appended claims.

Having thus described my invention, what I claim is:

1. The method for mounting an emergency wheel having a pneumatic tire so as to support an axle member of a vehicle in case of damage to the road tire of the road wheel mounted on said axle member to thereby enable said vehicle to be operated comprising the steps of providing an emergency wheel having a rim portion mounting a pneumatic tire, said tire having an uninflated width substantially less than that of said road tire and said rim having a diameter less than that of said road wheel and tire rim, fastening the emergency wheel rim with its tire in the uninflated state on the vehicle road wheel outboard of the damaged road tire with a lower portion of said uninflated tire laterally deflected over a collapsed portion of the deflated vehicle road tire, and inflating the tire of said emergency wheel whereby said axle member is raised and supported by said emergency wheel such that the vehicle is supported with the load substantially off the damaged road tire to thereby put the vehicle in condition for immediate operation.

2. An emergency wheel adapted for use with the road wheel of a vehicle so as to support an axle member of said vehicle in case of damage to the road tire of said road wheel mounted on said axle member, said road wheel including a tire mounting rim having an axially extending rim flange, said emergency wheel comprising a wheel body having a rim, one lip of said rim having a diameter less than the inner diameter of the rim flange of said road wheel fitted within and against said rim flange, an inflatable tire having an uninflated width substantially less than said vehicle road tire and an uninflated flexible configuration so as to be laterally deflectable to fit over and above a collapsed portion of a deflated vehicle road tire and an inflated diameter substantially equal to the inflated vehicle road tire secured to said rim, fastener means mounting the emergency wheel with its tire in an uninflated state on the vehicle road wheel outboard of the damaged road tire and with said lip of said rim seated within and radially supported by said rim flange of said road wheel, and inflation means for inflating the tire of said emergency wheel after said emergency wheel has been mounted on said vehicle road wheel whereby said axle member is raised and supported by said emergency wheel with the load substantially off said damaged road tire to thereby put the vehicle in condition for immediate operation.

3. An emergency wheel as defined in claim 2 wherein the wheel body is of the disk type.

4. An emergency wheel as defined in claim 2 wherein the wheel body having a rim is of the annular disk type.

5. An emergency wheel as defined in claim 2 wherein said fastener means comprise clamp-type means, each of said clamp means having when assembled with said emergency wheel an inboard end and an outboard end, said inboard end having means adapted for engagement with the vehicle road wheel structure, and said outboard end having means for applying a force on said emergency wheel whereby said emergency wheel is moved into operative engagement with the vehicle road wheel.

6. An emergency wheel as defined in claim 2 wherein the fastener means comprise a plurality of fasteners adapted for mounting the emergency wheel on the outside surface of the vehicle road wheel, each of said fasteners having when assembled with said emergency wheel an inboard end and an outboard end, said inboard end having means for engaging said road wheel structure, said outboard end having structure operatively associated with means for applying a force on said fastener, inflatable means on the outboard side of said emergency wheel engaging said force-applying structure of each of said fasteners, valve means for admitting fluid under pressure into said inflatable means, and locking means associated with each of said fasteners, said locking means having a locked and an unlocked position, said locked position serving to lock said fasteners against movement, said unlocked position freeing said fasteners to permit a pressure caused displacement of said inflatable means whereby said displacement brings said emergency wheel into operative engagement with said vehicle road wheel.

7. An emergency wheel as defined in claim 2 wherein at least a portion of at least one of the sidewalls of the tire of the emergency wheel has sufficient flexibility when said tire is in the deflated state to permit said tire to be manipulated such that said emergency wheel can be mounted for use.

8. An emergency wheel as defined in claim 2 wherein the fastener means comprise a plurality of fasteners adapted for engagement with the wheel structure of the vehicle road wheel, and wherein said fastener means further comprise an annular arrangement of latching means associated with the inboard sidewall of the emergency tire, said arrangement being spaced radially outward from the emergency wheel rim in concentric relationship therewith, said sidewall having an annular area of reduced wall thickness in operating proximity with said arrangement of latching means and in concentric relationship therewith whereby the inflation of said emergency tire after the emergency wheel has been fastened in place causes a displacement relatively outwardly of the sidewall in the region of the reduced wall thickness such that the outwardly displaced portion of said sidewall forces said latching means into a clamping engagement with the rim of said vehicle road wheel.

9. An emergency wheel as defined in claim 8 wherein the annular arrangement of latching means associated with the inboard sidewall is a ring of hook-shaped fingers of high-strength, resilient material.

10. An emergency wheel as defined in claim 8 wherein the annular arrangement of latching means associated with the inboard sidewall are contoured projecting areas of said sidewall.

11. An emergency wheel adapted for use with the road wheel of a vehicle so as to support an axle member of said vehicle in case of damage to the road tire of said road wheel mounted on said axle member comprising a wheel body having a rim, an inflatable tire secured to said rim, fastener means adapted to mount the emergency wheel with its tire in an uninflated state on the vehicle road wheel outboard of the damaged road tire, and inflation means for inflating the tire of said emergency wheel after said emergency wheel the tire been mounted on said vehicle road wheel whereby said axle member is raised and supported by said emergency wheel with the load substantially off said damaged road tire to thereby put the vehicle in condition for immediate operation wherein said inflation means comprise a pressurized fluid reservoir incorporated in the body structure of said emergency wheel, first valve means for admitting fluid under pressure into said reservoir, conduit means defining a fluid passage between the interior of said fluid reservoir and the interior of the emergency tire, and second valve means in said conduit means whereby pressurized fluid for said reservoir can be admitted into the interior of said emergency tire to thereby inflate it.

12. An emergency wheel as defined in claim 11 wherein the body structure comprises first and second concentric disk members joined in a sealed relationship with one another at their peripheries and having a spaced relationship with one another intermediate said peripheries to thereby form the fluid reservoir.

13. An emergency wheel as defined in claim 11 wherein the valve and conduit means include first normally closed valve means, second normally closed valve means, said conduit means having an opening exteriorly of the reservoir, said valves being positioned coaxially in tandem in said conduit means, said first valve having a coaxial spring-loaded valve pin which serves when depressed to open said valve and having first and second depressed positions, said first valve pin being depressed to its first position to thereby admit fluid to said reservoir when said exterior opening of said conduit is connected to a pressurized fluid supply, said second valve having a coaxial spring-loaded valve pin which serves when depressed to open said valve, said second valve pin being depressed by said first valve pin when in its said second position, a cup-shaped valve cap adapted to fit on the exterior outlet end of said conduit and having first and second positions thereon, said cap having a valve actuating stem projecting coaxially from the inside end wall thereof, said valve actuating stem being adapted when said cap is in its second position to depress said first valve pin into its second position whereby the placing of said valve cap into its second position opens said second valve to pass fluid into said tire through said conduit means to thereby inflate said tire.